(12) United States Patent
Hill

(10) Patent No.: US 6,320,711 B2
(45) Date of Patent: *Nov. 20, 2001

(54) HIGH-SPEED UNIFIED DATA INTERFACE FOR A READ CHANNEL IN A DISK DRIVE SYSTEM

(75) Inventor: John P. Hill, Nederland, CO (US)

(73) Assignee: STMicroelectronics N.V. (NL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/072,276

(22) Filed: May 4, 1998

Related U.S. Application Data

(60) Provisional application No. 60/066,701, filed on Nov. 25, 1997.

(51) Int. Cl.[7] .............................. G11B 5/09; G11B 5/596
(52) U.S. Cl. ........................ 360/46; 360/41; 360/77.08
(58) Field of Search ................................ 360/41, 46, 65, 360/75, 77.08

(56) References Cited

U.S. PATENT DOCUMENTS

| | | | |
|---|---|---|---|
| 5,027,233 | 6/1991 | Berti et al. | 360/77.02 |
| 5,341,249 | 8/1994 | Abbott et al. | 360/46 |
| 5,612,833 | 3/1997 | Yarmchuk et al. | 360/75 |
| 5,659,436 | 8/1997 | Yarmchuk et al. | 360/75 |
| 5,684,972 | 11/1997 | Hill et al. | 395/404 |
| 5,726,821 * | 3/1998 | Cloke et al. | 360/46 |
| 5,793,556 | 8/1998 | Freitas et al. | 360/11.08 |
| 5,801,896 | 9/1998 | Freitas | 360/77.08 |
| 5,844,744 | 12/1998 | Suzuki et al. | 360/78.09 |
| 5,907,447 | 5/1999 | Yarmchuk et al. | 360/75 |
| 5,956,196 * | 9/1999 | Hull et al. | 360/65 |
| 5,978,752 | 11/1999 | Morris | 702/186 |

\* cited by examiner

Primary Examiner—David Hudspeth
Assistant Examiner—Regina Y. Neal
(74) Attorney, Agent, or Firm—Lisa K. Jorgenson; William J. Kubida

(57) ABSTRACT

The invention provides a high-speed interface that transfers user data and other data over a single unified interface between a read channel integrated circuit and another integrated circuit, such as the drive control integrated circuit. The high-speed interface eliminates the need for analog pins on the integrated circuits to lower the cost of the system. The high-speed interface also eliminates the use of the serial interface to transfer the servo position data and other data which speeds up the data transfer. Examples of the other data include read channel settings, read channel performance data, and servo data. A read channel integrated circuit exchanges the user data with a data bus when the disk drive system is reading or writing the user data. The read channel integrated circuit exchanges the other data with the data bus when the disk drive system is reading servo data. The other integrated circuit exchanges the user data with the data bus when the disk drive system is reading or writing the user data. The other integrated circuit exchanges the other data with the data bus when the disk drive system is reading the servo data. The data bus transfers the user data and the other data between the integrated circuits.

22 Claims, 4 Drawing Sheets

HIGH-SPEED UNIFIED DATA INTERFACE FOR A READ CHANNEL IN A DISK DRIVE SYSTEM

RELATED APPLICATION

This patent application references U.S. provisional patent application No. 60/066,701 filed on Nov. 25, 1997.

FIELD OF THE INVENTION

The invention is related to the field of disk drive systems, and in particular, to a high-speed interface that transfers user data and other data between a read channel integrated circuit and another integrated circuit.

PROBLEM

A magnetic disk system stores user data in data tracks on the surface of a disk device. The user data is transferred between the disk and the user as follows. A head is positioned over a circular data track and reads the user data as the disk spins. The head transfers the user data to a pre-amp, and the pre-amp transfers the user data to a read channel integrated circuit. The read channel integrated circuit processes and transfers the user data to a drive manager integrated circuit over a high-speed bus, such as a Non-Return to Zero (NRZ) bus. The drive manager integrated circuit transfers the user data to the user.

The magnetic disk system also stores servo position data in servo sectors on the surface of the disk device. The servo sectors are interspersed along the circular data tracks so that the head periodically encounters the servo sectors as the disk spins. When the heads are positioned over a servo sector, they transfer servo data and not user data. When the heads are positioned over a data sector with user data, they transfer user data and not servo data.

A servo system uses the servo position data to position a read/write head over a data track that contains the desired user data. One form of servo position data is coarse-resolution data that identifies the data track that is under the head. Coarse-resolution data has a resolution of plus or minus one track and does not have the resolution to center the head over the data track. The other form of servo position data is high-resolution data that indicates how far off-center a head is relative to the data track. The servo system uses the coarse-resolution data to position a head near the proper data track and uses the high-resolution data to center the head over the center of that track. The servo system must have the servo position data to effectively store or retrieve user data.

Servo position data is transferred from the disk to the servo system as follows. A read/write head reads the servo position data from the disk device. The read/write head transfers the servo position data through a pre-amp to a read channel integrated circuit. The read channel integrated circuit processes the servo position data and transfers the processed data to a drive manager integrated circuit. A processor in the drive manager integrated circuit uses the servo position data to direct the servo system to position the head.

One prior system for transferring servo position data from the disk to the processor uses dedicated analog connections to transfer the high-resolution data from the read channel integrated circuit to the drive control integrated circuit. The analog lines require dedicated pins on each integrated circuit that increase the cost of the integrated circuits, and the corresponding cost of the disk drive systems that incorporate the integrated circuits. The course-resolution data is transferred from the read channel integrated circuit to the drive control integrated circuit by lines that transmit a representation of the data pulses in the coarse-resolution servo data field. These lines are sometimes referred to as pulse/polarity lines.

Another prior system for transferring servo position data from the disk to the processor uses the read channel integrated circuit to convert the high-resolution data from analog to digital. This prior system then transfers the high-resolution data over a serial interface between the read channel integrated circuit and the drive control integrated circuit. Although, the course-resolution data is still transferred by the pulse/polarity lines, it could be decoded in the read channel integrated circuit and transferred to the drive control integrated circuit over the serial interface. The serial interface can be slow given the typical baud rate and the increase in the amount of servo position data. Unfortunately, the slow speed of the serial interface may limit the accurate positioning of the head to read or write data. The slow speed of the serial interface also limits the ability of the servo system to follow high-density data tracks that increase drive capacity. In addition, it is undesirable to transfer data over the serial interface while data is being read due to signal to noise issues.

Prior systems also use the serial interface to transfer control information between the drive manager integrated circuit and the read channel integrated circuit. The processor in the drive manager integrated circuit transfers control information to configuration registers in the read channel integrated circuit. The control information contains settings that control the operation of the read channel integrated circuit. The control information can also request information such as the course-resolution data, high-resolution data, performance information, status and mode information. If the control information could be transferred through another means, the serial bus could be eliminated to eliminate pins and save cost.

At present, there is a need for a more efficient system to transfer servo position data from the read channel integrated circuit to the drive manager integrated circuit. Such a system should transfer the servo position data at high speeds and should eliminate the analog pins on the integrated circuits. There is also a need for an alternative means to transfer control information from the drive manager integrated circuit to the read channel integrated circuit.

SOLUTION

The invention overcomes the above problems by providing a high-speed interface that exchanges user data and other data between the read channel integrated circuit and another integrated circuit, such as the drive manager integrated circuit. The high-speed interface eliminates the need for analog pins on the integrated circuits to transfer high-resolution servo position data, and thus lowers the cost of the system. The high-speed interface eliminates the need to use the serial interface to transfer servo position data, and thus speeds up the data transfer. The high-speed interface eliminates the need to use the serial interface to transfer read channel control information, and thus the serial interface could be eliminated to save cost.

The invention includes methods, systems, and integrated circuits for transferring user data and other data in a disk drive system. A read channel integrated circuit exchanges the user data with a data bus when the disk drive system is reading or writing the user data. The read channel integrated circuit exchanges the other data with the data bus when the disk drive system is reading servo data. The other integrated circuit exchanges the user data with the data bus when the disk drive system is reading or writing the user data. The other integrated circuit exchanges the other data with the data bus when the disk drive system is reading the servo data. The data bus transfers the user data and the other data between the integrated circuits. One example of the other integrated circuit is a drive manager integrated circuit. One example of the data bus is a Non-Return to Zero (NRZ) bus. Examples of the other data include read channel integrated circuit settings, read channel integrated circuit performance data, servo data, high-resolution servo data, and coarse-resolution servo data.

The read channel integrated circuit is able to exchange the other data with the data bus when the head is positioned over a servo sector because no user data is being transferred over the data bus during this period. Using the same high-speed data bus that transfers user data to also transfer other data represents a distinct advance in the art. Use of the high-speed bus to transfer the other data at high speed increases system performance and data transfer capacity while minimizing pin count.

Figure 1:
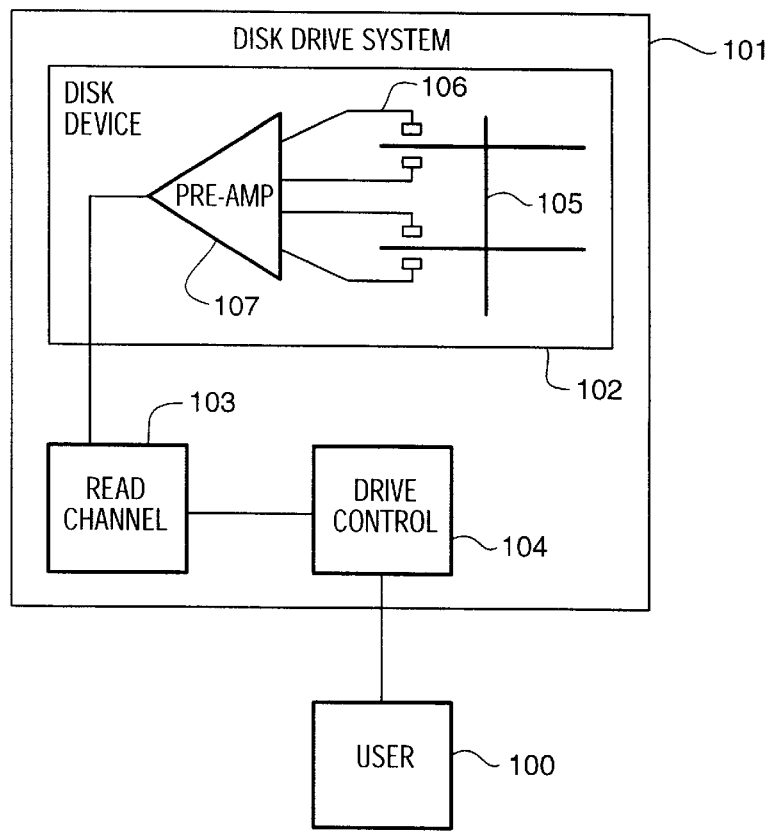
FIG. 1 is a block diagram of a version of the invention and depicts a disk drive system.

DETAILED DESCRIPTION
System Configuration and Operation—FIG. 1

FIG. 1 depicts a user 100 that is coupled to a disk drive system 101. The user 100 stores and retrieves user data from the disk drive system 101. One example of the user 100 is a personal computer. The disk drive system 101 includes a disk device 102 that is coupled to a read channel integrated circuit 103. The read channel integrated circuit 103 is coupled to a drive control integrated circuit 104, and the drive control integrated circuit 104 is coupled to the user 100. Those skilled in the art appreciate that some conventional elements of the disk drive system 101 have been omitted for reasons of clarity.

The disk device 102 is comprised of disks 105, heads 106, and a pre-amp 107. The heads 106 read and write data to the disks 105. The pre-amp 107 connects one of the heads to the read channel integrated circuit 103. The disk device 102 is conventional and can be the VOYAGER 3 supplied by Samsung.

The read channel integrated circuit 103 provides the system interface to the heads 106 of the disk device 102. When data is written, the read channel integrated circuit 103 encodes the data and transfers the data to one of the heads 106 through the pre-amp 107. When data is read, the read channel integrated circuit 103 receives a read signal from one of the heads 106 through the pre-amp 107. The read channel integrated circuit 103 separates the user data and the servo position data in the read signal for individual processing.

The read channel integrated circuit 103 uses a multiplexer to exchange user data and other data with the disk control integrated circuit 104 over a data bus, such as a high-speed Non-Return to Zero (NRZ) bus. The read channel integrated circuit 103 exchanges the user data with the data bus when the disk device 102 is reading the user data and is not reading the servo data. The read channel integrated circuit 103 exchanges the other data with the data bus when the disk device 102 is reading the servo data and is not reading the user data. Some examples of the other data include servo data, read channel settings, and read channel performance data. The read channel integrated circuit 103 could be adapted from the model # ADRT 1000 supplied by Analog Devices.

The drive control integrated circuit 104 controls the operation of the disk drive system 101. The drive control integrated circuit 104 controls the position of the heads 106 relative to the disks 105. The drive control integrated circuit 104 controls the data transfer between the user 100 and the disk drive system 101. The drive control integrated circuit 104 is used in some embodiments of the invention, but those skilled in the art are aware that the functionality of the drive control integrated circuit 104 can be distributed among multiple inter-connected integrated circuits. The invention is not restricted to the use of a single drive control integrated circuit 104, but also encompasses the use of a configuration of integrated circuits that interface with the read channel integrated circuit to 103 to transfer user data and other data over a data bus.

The drive control integrated circuit 104 exchanges the user data with the data bus when the disk device 102 is reading the user data and is not reading the servo data. The drive control integrated circuit 104 exchanges the other data with the data bus when the disk device 102 is reading the servo data and is not reading the user data. The drive control integrated circuit 104 exchanges the user data with the user 100 and the other data with the appropriate processing functions in the drive control integrated circuit 104. The drive control integrated circuit 104 can be adapted from the AIC-5460 supplied by Adaptec of Milipitas, Calif.

In operation, the user 100 stores and retrieves user data as follows. The user 100 transfers the user data to the drive control integrated circuit 104. The drive control integrated circuit 104 multiplexes the user data and the other data onto a data bus for transfer to the read channel integrated circuit 103. The drive control integrated circuit 104 uses servo position data to direct the positioning of the heads 106 to the proper location on the disks 105 for user data storage. The read channel integrated circuit 103 de-multiplexes the user data and the other data from the data bus. The read channel integrated circuit 103 encodes the user data and transfers the user data to the pre-amp 107. The pre-amp 107 transfers the user data to one of the heads 106 that is selected by the drive control integrated circuit 104. The selected head writes the user data to the data track on the disks 105 that is positioned under the head.

To retrieve the user data, the selected head 106 is re-positioned over the data track on the disks 105 under the control of the drive control integrated circuit 104. The head reads the user data and the servo data that is under the head and transfers the data to the pre-amp 107. The pre-amp 107 transfers the data from the selected head to the read channel integrated circuit 103. The read channel integrated circuit 103 separates the user data and the servo position data. The read channel integrated circuit 103 multiplexes the user data and the other data onto the data bus for transfer to the drive control integrated circuit 104. The drive control integrated circuit 104 de-multiplexes the user data and the other data from the data bus. The drive control integrated circuit 104 exchanges the user data with the user 100 and the other position data with the appropriate processing functions in the drive control integrated circuit 104.

Figure 2:
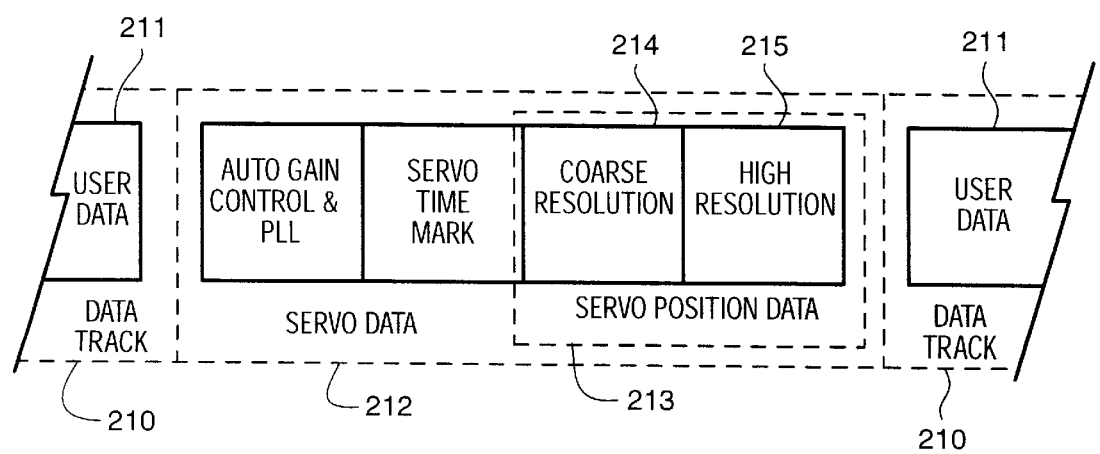
FIG. 2 is a block diagram of a servo sector.
Figure 3:
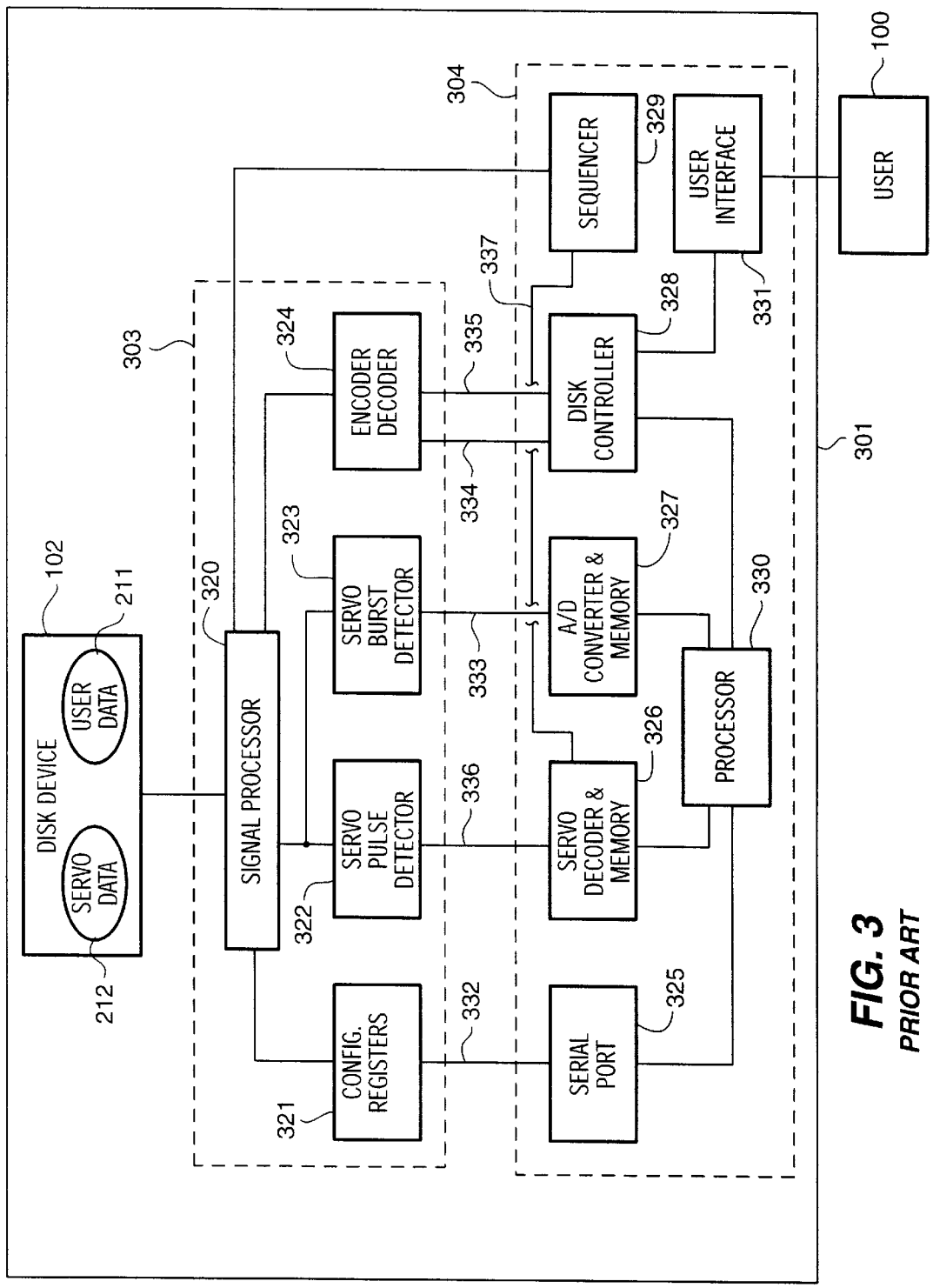
FIG. 3 is a block diagram of a known read channel integrated circuit and drive control integrated circuit.
Figure 4:
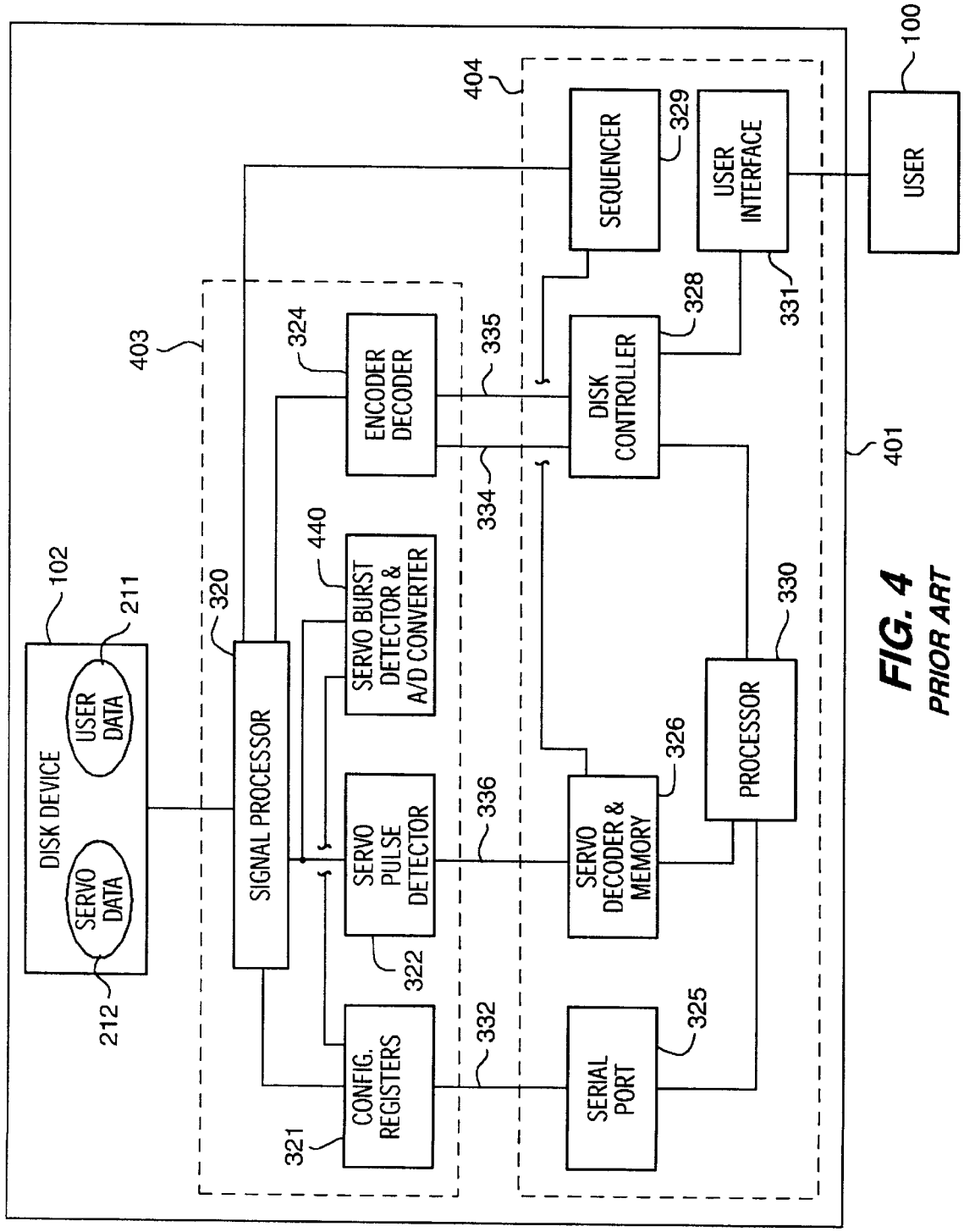
FIG. 4 is a block diagram of a known read channel integrated circuit and drive control integrated circuit.

Underlying Technology—FIGS. 2–4

FIG. 2 depicts servo data 212 that is interspersed in a data track 210 that contains user data 211. The user data 211 is the information that a user of a disk drive system typically stores on the disk drive system. Examples of the user data 211 include application software, document files, and records. A number of servo sectors that contain such servo data are periodically interspersed along the data tracks of a disk drive system. The servo data 212 contains automatic gain control information, phase-locked loop timing information, and a servo timing mark. The servo data 212 also contains servo position data 213 that is comprised of coarse-resolution data 214 and high-resolution data 215. The coarse-resolution data 214 are pulses that are typically encoded using the Grey Code and identify the data track 210. The coarse-resolution data 214 has a resolution of one track and does not have the resolution to center the head over the data track 210. The high-resolution data 215 is comprised of servo bursts that indicate how far off-center a head is relative to the data track 210. The servo system uses the coarse-resolution data 214 to position a head near the data track 210 and uses the high-resolution data 215 to center the head over the center of the data track 210.

FIG. 3 depicts a disk drive system 301 that is known in the art. The disk device 102 contains the user data 211 and the servo data 212. The read channel integrated circuit 303 comprises signal processor 320, configuration registers 321, servo pulse detector 322, servo burst detector 323, and encoder/decoder (endec) 324. The drive control integrated circuit 304 comprises serial port 325, servo decoder and memory 326, analog-to-digital (A/D) converter and memory 327, disk controller 328, sequencer 329, processor 330, and user interface 331. The read channel integrated circuit 303 and the drive control integrated circuit 304 are connected by a serial interface 332, analog lines 333, clock signal 334, NRZ bus 335, and pulse/polarity lines 336.

In operation, the signal processor 320 receives a read signal that contains the user data 211 and the servo data 212 from the disk device 102. The signal processor 320 transfers the user data 211 to the endec 324. The endec 324 transfers the user data 211 to the disk controller 328 over the NRZ bus 335. The disk controller 328 forwards the user data 211 to the user 100 though the user interface 331. The user data 211 is transferred from the user 100 to the disk device 102 in a reciprocal manner.

The signal processor 320 transfers the servo data 212 to the servo pulse detector 322, and the servo pulse detector 322 detects the pulses comprising the coarse-resolution servo position data in the servo data 212. The servo pulse detector 322 transfers the coarse-resolution servo position data over the pulse/polarity lines 336 to the servo decoder and memory 326. The servo decoder and memory 326 decodes the coarse-resolution servo position data and stores it in memory. The processor 330 obtains the decoded coarse-resolution servo position data from the servo decoder and memory 326 and uses the coarse-resolution servo position data to position the heads near the desired data tracks.

The signal processor 320 transfers the high-resolution servo position data to the servo burst detector 323. The servo burst detector 323 detects the amplitudes of the servo bursts in the high-resolution servo position data using analog peak detection, analog area detection, or variations of these well-known methods. The servo burst detector 323 transfers the amplitude information over the analog lines 333 to the A/D converter and memory 327. The A/D converter and memory 327 converts the high-resolution servo position data from analog-to-digital and stores the digital data in memory. The processor 330 obtains the high-resolution servo position data from the A/D converter and memory 327 and uses the high-resolution servo position data to center the heads over the desired data tracks.

The processor 330 provides configuration information to the read channel integrated circuit 303. The configuration information contains settings and variables that control the operation of read channel integrated circuit 303. The processor 330 transfers the configuration information to the serial port 325 for transfer over the serial interface 332 to the configuration registers 321. The signal processor 320 reads the configuration information from the configuration registers 321 and operates accordingly.

The sequencer 329 receives timing information from the servo decoder and memory 326 over the line 337. The timing information is derived from the phase-locked-loop field and servo timing mark in the servo data. The sequencer 329 uses the timing information to provide a signal to the signal processor 320. The signal indicates when the disk device 102 is reading or writing the user data 211 and when the disk device 102 is reading the servo data 212. The heads do not transfer the user data 211 when they are positioned over the servo data 212. Likewise, the heads do not transfer the servo data 212 when they are positioned over the user data 211. As a result, the NRZ bus 335 does not transfer the user data 211 when the disk device 102 is reading the servo data 212.

FIG. 4 depicts another disk drive system 401 that is known in the art. The disk drive system 401 is a modified version of the disk drive system 301 of FIG. 3. The analog lines 333 and the A/D converter and memory 327 of FIG. 3 have been removed. The servo burst detector 323 and the A/D converter and memory 327 from FIG. 3 are combined into a servo burst detector and A/D converter element 440. The read channel integrated circuit 403 now converts the high-resolution servo position data from analog-to-digital in the element 440 and transfers the digital high-resolution servo position data to the configuration registers 321. The processor 330 obtains the high-resolution servo position data over the serial interface 332 and through the serial port 325. The configuration registers 321 can also be read by the serial port 325. This allows the processor 330 to obtain performance information or status from the signal processor 320. The element 440 either detects analog servo bursts and converts the results to digital information, or the element 440 over-samples the servo bursts with an A/D converter and uses a digital signal processor to detect the servo bursts from the digital signal produced by the over-sampling.

Although not depicted on FIG. 4, the disk drive system 401 could be further modified by removing the servo decoder and memory 326 and integrating its functionality into the servo pulse detector 322. The servo pulse detector 322 would then transfer the coarse-resolution data to the configuration registers 321. The processor 330 would obtain both the coarse-resolution and high-resolution servo position data over the serial interface 332 and through the serial port 325.

Figure 5:
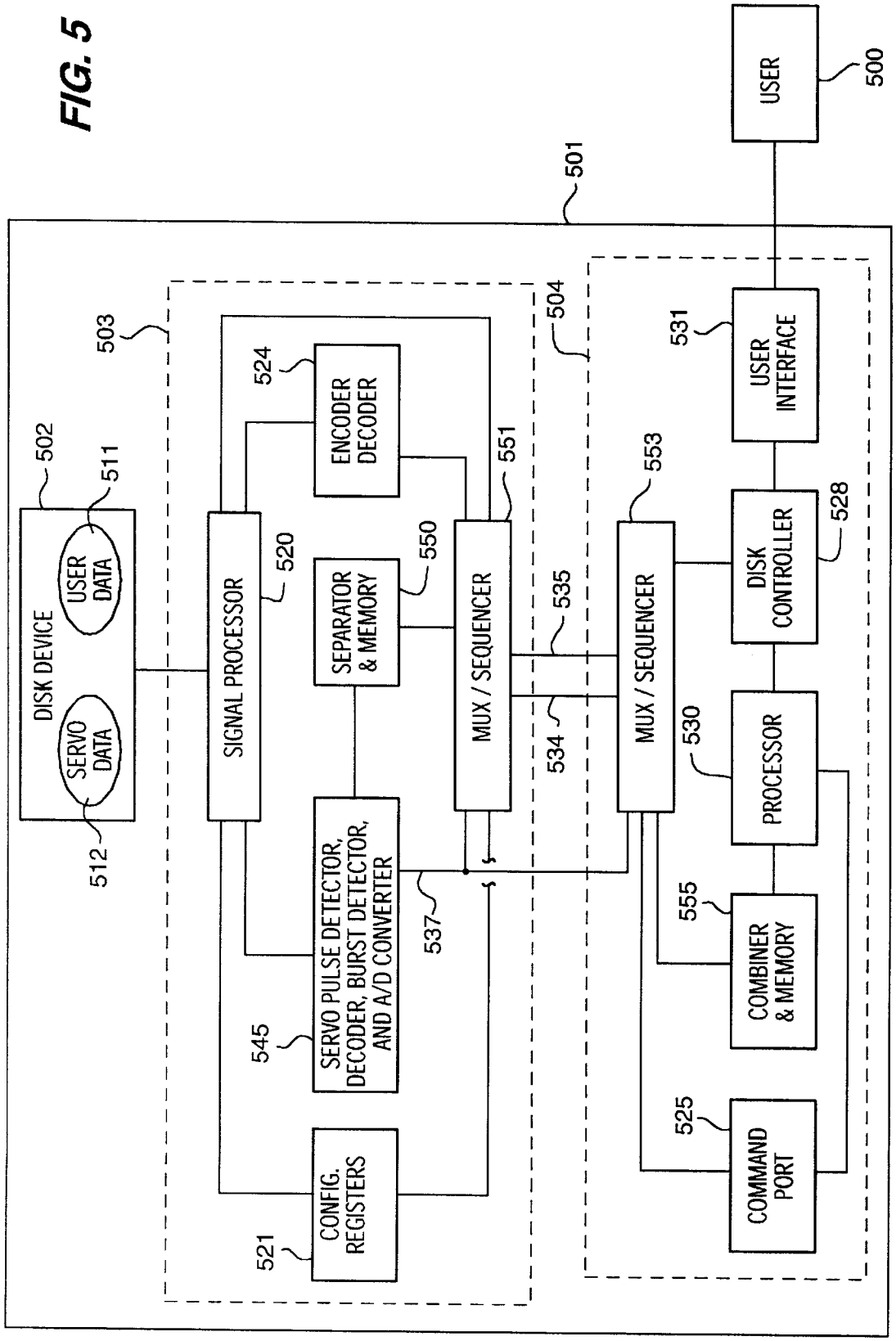
FIG. 5 is a block diagram of a version of the invention and depicts a read channel integrated circuit and a drive control integrated circuit.

High-Speed Transfer of User Data and Other Data—FIG. 5

FIG. 5 depicts the user 500 coupled to a disk drive system 501 that is configured in accord with the present invention. Components that are similar to those described above retain the same last two digits of the reference number. The disk drive system 501 transfers the user data and other data over the high-speed NRZ bus 535. Some examples of the other data include high-resolution servo position data, coarseresolution servo position data, read channel performance information, read channel settings, timing information, and other read channel information. The use of the high-speed NRZ bus 535 eliminates the need for additional interfaces and pins to transfer this other data and reduces cost. The high-speed NRZ bus 535 transfers the servo position data and read channel information faster than a serial interface to improve system performance.

The disk device 502 stores user data 511 and servo data 512. The read channel integrated circuit 503 comprises signal processor 520, configuration registers 521, servo pulse detector, decoder, burst detector, and A/D converter element 545, separator and memory 550, mux/sequencer 551, and endec 524. The drive control integrated circuit 504 comprises command port 525, combiner and memory 555, mux/sequencer 553, disk controller 528, processor 530, and user interface 531. The read channel integrated circuit 503 and the drive control integrated circuit 504 are connected by a clock signal 534, an NRZ bus 535, and timing information line 537.

In operation, the signal processor 520 receives a read signal that contains the user data 511 and the servo data 512 from the disk device 502. The signal processor 520 transfers the user data 511 to the endec 524. The endec 524 transfers the user data 511 to the mux/sequencer 551. When the disk device 502 is reading the user data 511, the mux/sequencer 551 transfers the user data 511 to the mux/sequencer 553 over the NRZ bus 535. The mux/sequencer 553 transfers the user data 511 to the disk controller 528. The disk controller 528 forwards the user data 511 to the user 500 though the user interface 531. The user data 511 is transferred from the user 500 to the disk device 502 in a reciprocal manner 511 where the mux/sequencer 553 transfers the user data 511 to the mux/sequencer 551 over the NRZ bus 535 when the disk device 502 is writing the user data 511.

The signal processor 520 transfers the servo data 512 in the read signal to the servo pulse detector, decoder, burst detector, and A/D converter element 545. The element 545 detects the pulses in the coarse-resolution servo position data. The element 545 also provides digital high-resolution servo position data. The element 545 either detects analog servo bursts and converts the results to digital information, or the element 545 over-samples the servo bursts with an A/D converter and uses a digital signal processor to detect the servo bursts from the digital signal produced by the over-sampling. The element transfers the coarseresolution and high-resolution servo position data to the separator and memory 550. The separator and memory 550 separates the servo position data into data words that are the width of the NRZ bus and stores the data words in a memory. The mux/sequencer 551 obtains the data words containing the servo position data from the separator and memory 550. This data will be sent when available in the separator and memory 550 after being enabled by a command from command port 525 through mux/sequencer 553.

The signal processor 520 transfers read channel performance data to the configuration registers 521. The mux/sequencer 551 obtains read channel performance data from the configuration registers 521 after being enabled by a command from command port 525 through mux/sequencer 553. The mux/sequencer 551 transfers the servo position data words and the read channel performance data to the mux/sequencer 553 over the NRZ bus 535 when the disk device 502 is reading the servo data 512.

The mux/sequencer 553 transfers the read channel performance data to the command port 525. The mux/sequencer 553 transfers the servo position data words to the combiner and memory 555. The combiner and memory 555 concatenates servo position data words that are the width of the NRZ bus 535 into the coarse-resolution and high-resolution servo position data and stores the data in a memory. The memory could be a register array or a first-in first-out memory. Those skilled in the art recognize that separator/combiner elements may be required if the data sent between the command port 525 and the configuration registers 521 is a different width than the NRZ bus 535. This data includes commands, status, and read channel performance data.

The processor 530 obtains the coarse-resolution and high-resolution servo position data from the combiner and memory 555. The processor 530 uses the coarse-resolution servo position data to position the heads near the desired data tracks, and uses the high-resolution servo position data to center the heads over the data tracks. The processor 530 obtains the read channel performance data from the command port 525.

The processor 530 transfers read channel settings to the command port 525, and the command port 525 transfers the read channel settings to the mux/sequencer 553. The mux/sequencer 553 transfers the read channel settings to the mux/sequencer 551 over the NRZ bus 535 when the disk device 502 is reading the servo data 512. The mux/sequencer 551 transfers the read channel settings to the configuration registers 521. The signal processor 520 obtains the read channel settings and operates accordingly.

The mux/sequencers 551 and 553 receive timing information from the element 545 over the lines 537. Alternatively, the timing information could be transferred over the NRZ bus 535. The timing information is derived from the phase-locked-loop field and servo timing mark in the servo data. The mux/sequencer 551 uses the timing information to provide a sequence signal to the signal processor 520, endec 524, separator and memory 550, and configuration registers 521. The mux/sequencer 553 uses the timing information to provide a sequence signal to the combiner and memory 555, the disk controller 528, and the command port 525. The sequence signals indicate when the disk device 502 is reading or writing the user data 511 and when the disk device 502 is reading the servo data 512. The heads do not transfer the user data 511 when they are positioned over the servo data 512. Likewise, the heads do not transfer the servo data 512 when they are positioned over the user data 511. As a result, the NRZ bus 535 does not transfer the user data 511 when the disk device 502 is reading the servo data 512.

The transfer of commands, status, and performance data over the NRZ bus 535 could occur during the first part of the servo data data 512 and could consist of different data types during each respective servo data field. The first part of the field typically has the automatic gain control, phase-locked loop, and the timing mark fields. The transfer of read channel settings, performance data, and commands could occur during the first part of the field when NRZ bus 535 is available. When that data has been transferred, the command port 525 would send a command to the mux/sequencer 551 and the configuration registers 521 to enable the transfer of servo position data from separator and memory 550 to the combiner and memory 555 during the second part of the servo data 512. The course-resolution data and the high-resolution data would then be transferred and the current values would be updated for every servo field in the same manner.

The mux/sequencer 551 selects the clock signal 534. When the user data 511 is transferred over the NRZ data bus 535, the clock signal 534 is synchronized to the NRZ data bus 535. When the other data is transferred over the NRZ data bus 535, the clock signal 534 originates in the separator and memory 550. The clock signal is synchronized to the servo data 512 on the NRZ bus 535 or is synchronized to the data between the command port 525 and the configuration registers 521 during the data transfer for the first part of the servo data 512. The clock signal 534 is used to gate the servo data 512 into the combiner and memory 555 or between the command port 525 and configuration registers 521.

Those skilled in the art appreciate that some conventional elements of the disk drive system 501 have been omitted for reasons of clarity. Those skilled in the art can appreciate variations of the above-described embodiments that fall within the scope of the invention. For example various types of other data could be transferred with the user data over the data bus instead of the specific set of other data listed for FIG. 5. As a result, the invention is not limited to the specific embodiments discussed above, but only by the following claims and their equivalents.

What is claimed is:

1. A system for transferring user data and other data in a disk drive system, the system comprising:
    a data bus operational to transfer the user data and the other data, wherein said other data comprises all servo data transferred in the system including coarse-resolution servo position data and high-resolution servo position data from an analog servo burst source;
    a read channel integrated circuit operationally coupled to the data bus and operational to exchange the user data with a data bus when the disk drive system is reading or writing the user data and to exchange the other data with the data bus when the disk drive system is reading the servo data; and
    another integrated circuit operationally coupled to the data bus and operational to exchange the user data with the data bus when the disk drive system is reading or writing the user data and operational to exchange the other data with the data bus when the disk drive system is reading the servo data.

2. The system of claim 1 wherein the other integrated circuit is a drive manager integrated circuit.

3. The system of claim 1 wherein the data bus is a Non-Return to Zero bus.

4. The system of claim 1 wherein the other data includes read channel integrated circuit setings.

5. The system of claim 1 wherein the other data includes read channel integrated circuit performance data.

6. The system of claim 1 that further comprises:
    a disk operational to store the user data and the servo data;
    a head operational to read the user data and the servo data from the disk and transfer the user data and the servo data to a pre-amp,
        wherein the pre-amp is operationally coupled to the head and operational to transfer the user data and the servo data to the read channel integrated circuit.

7. The system of claim 1 wherein the read channel integrated circuit further comprises a multiplexer operational to multiplex the user data and the other data.

8. The system of claim 1 wherein the other integrated circuit further comprises a multiplexer operational to de-multiplex the user data and the other data.

9. The system of claim 1 wherein the other integrated circuit further comprises a processor operational to use the other data to control positioning of a head relative to a disk device.

10. The system of claim 1 wherein the other integrated circuit further comprises a disk controller operational to transfer the user data to a user.

11. A read channel integrated circuit that comprises:
    an encoder/decoder operational to receive and process user data;
    a memory operational to store other data, wherein said other data comprises read servo data including coarse-resolution servo position data and high-resolution servo position data; and
    a multiplexer operationally coupled to the memory and to the encoder/decoder, and wherein the multiplexer is operational to multiplex the user data and the other data and transfer the multiplexed data to a data bus.

12. A drive control integrated circuit that comprises:
    a multiplexer operational to receive multiplexed data from a data bus and de-multiplex the multiplexed data into user data and other data;
    a processor operationally coupled to the multiplexer and operational to use the other data, wherein said other data comprises all servo data including coarse-resolution servo position data and high-resolution servo position data; and
    a disk controller operationally coupled to the multiplexer and operational to transfer the user data to a user.

13. A method for transferring user data and other data in a disk drive system, the system comprising:
    exchanging the user data over a data bus between a read channel integrated circuit and another integrated circuit when the disk drive system is reading or writing the user data; and
    exchanging the other data over the data bus between the read channel integrated circuit and the other integrated circuit when the disk drive system is reading servo data, wherein said other data comprises the read servo data including coarse-resolution servo position data and high-resolution servo position data.

14. The method of claim 13 wherein the other integrated circuit is a drive manager integrated circuit.

15. The method of claim 13 wherein the data bus is a Non-Return to Zero bus.

16. The method of claim 13 wherein the other data includes read channel integrated circuit settings.

17. The method of claim 13 wherein the other data includes read channel integrated circuit performance data.

18. The method of claim 13 further comprising reading the user data and servo position data from a disk device and transferring the user data and the servo position data to the read channel integrated circuit.

19. The method of claim 13 further comprising multiplexing the user data and the other data in the read channel integrated circuit.

20. The method of claim 13 further comprising de-multiplexing the user data and the other data in the other integrated circuit.

21. The method of claim 13 further comprising using the other data in the other integrated circuit to control positioning of a head relative to a disk device.

22. The method of claim 13 further comprising transferring the user data from the other integrated circuit to a user.

* * * * *